US006384782B2

(12) United States Patent
Erikmats et al.

(10) Patent No.: US 6,384,782 B2
(45) Date of Patent: May 7, 2002

(54) ANTENNA ARRANGEMENT AND METHOD FOR SIDE-LOBE SUPPRESSION

(75) Inventors: Östen Erikmats, Pixbo; Jonny Eriksson, Göteborg, both of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/738,288

(22) Filed: Dec. 18, 2000

(30) Foreign Application Priority Data

Dec. 22, 1999 (SE) .......................................... 9904718

(51) Int. Cl.[7] .......................................... G01S 3/28
(52) U.S. Cl. .......................................... 342/379
(58) Field of Search .......................................... 342/379

(56) References Cited

U.S. PATENT DOCUMENTS 4,638,320 A 1/1987 Eggert et al.
4,939,523 A 7/1990 Jehle et al.
5,430,452 A 7/1995 DuBois

*Primary Examiner*—Thomas H. Tarcza
*Assistant Examiner*—Fred H Mull
(74) *Attorney, Agent, or Firm*—Nixon & Vanderhye P.C.

(57) ABSTRACT

In an antenna system having an array of antenna elements (10, 10') and circuitry (111, 14) for controlling the phase of each element an arrangement (113) is provided for correcting the phase setting of each element as a function of the position of each element within the array expressed in polar co-ordinates. The phase correction is proportional to the sinusoid of the angular position of the element and proportional to an odd polynomial of radius having at least one term of third order or above. The resulting beam pattern includes low side-lobes in the lower hemisphere and gives rise to only limited and acceptable power loss on transmission. Furthermore, the implementation is rendered very simple, as the phase correction may be calculated element by element.

17 Claims, 4 Drawing Sheets

ANTENNA ARRANGEMENT AND METHOD FOR SIDE-LOBE SUPPRESSION

FIELD OF INVENTION

The invention relates generally to phased antenna arrays and more particularly to side-lobe suppression systems as applied to phased antenna arrays.

BACKGROUND ART

Antenna arrays consist of an arrangement of closely spaced antenna elements uniformly spread over the antenna area or aperture. The beam pattern for phased array antennas includes a principal or main lobe used for detecting a target and several side-lobes of reduced radiation energy grouped around the principal lobe. The direction and shape of the beam is controlled by altering the phase and amplitude of the individual elements. A problem with airborne antenna systems is that side-lobes directed towards the ground pick up ground clutter, which can interfere with echoes detected by the principal lobe and severely reduce the radar's ability to detect weak target echoes. Conventionally, side-lobe clutter is mitigated by reducing the side-lobe radiation power by amplitude weighting of the aperture. Amplitude weighting works well on reception, introducing only a limited and acceptable power loss. However, in a system employing an active phased array, amplitude weighting on transmission involves an unacceptably high power loss, typically of around 5 to 6 dB.

An alternative technique to amplitude weighting is described in U.S. Pat. No. 4 939,523. This involves weighting or tapering the phase of the antenna elements only. The resulting beam has a sharply focussed main lobe and an asymmetric arrangement of side-lobes, with the side-lobes in the lower hemisphere of the antenna, that is the side-lobes directed towards the ground, being low. However, the implementation suggested in this reference is very complex. The phase distribution across the antenna aperture is obtained using an inverse Fourier transform, and the phase variation across the aperture must be recalculated, or table-interpolated, during the roll of the aircraft to maintain low side-lobes towards ground.

There is thus a need for an antenna implementation whic minimises side-lobe clutter with acceptable power-loss on transmission, which also performs well on reception and which is simple to implement.

SUMMARY OF INVENTION

According to the invention, an antenna system is proposed having an array of antenna elements and phase control circuitry for setting the phase of signals that may be fed to and received by each element. The phase control circuitry includes a phase correction arrangement for correcting the phase of each element as a function of the position of the element within the array.

Preferably the phase correction is proportional to a first function of the angular position of the element and proportional to a second function of the radial position of the element relative to a central point in the array. The first function is a sinusoid of angular position of the element and the second function is an odd polynomial of the radial position of the element having at least one term of third order or above. The phase correction arrangement may comprise several modules, wherein each module is associated with a single or more than one element. The invention also relates to a method for suppressing side-lobes.

By providing the phase correction as a simple function of the position of each element expressed in radial and angular position, the implementation is rendered very simple; in particular, the phase correction may be calculated element by element. Furthermore, changes in the orientation of the antenna, such as during aircraft roll, for example, may be compensated for simply by a shift in the origin of the angular term of the function for each element in the array. The resulting beam pattern includes low side-lobes in the lower hemisphere and gives rise to only limited and acceptable power loss on transmission.

BRIEF DESCRIPTION OF THE DRAWINGS

Further objects and advantages of the present invention will become apparent from the following description of the preferred embodiments that are given by way of example with reference to the accompanying drawings. In the figures.

DETAILED DESCRIPTION OF THE DRAWINGS

Figure 1:
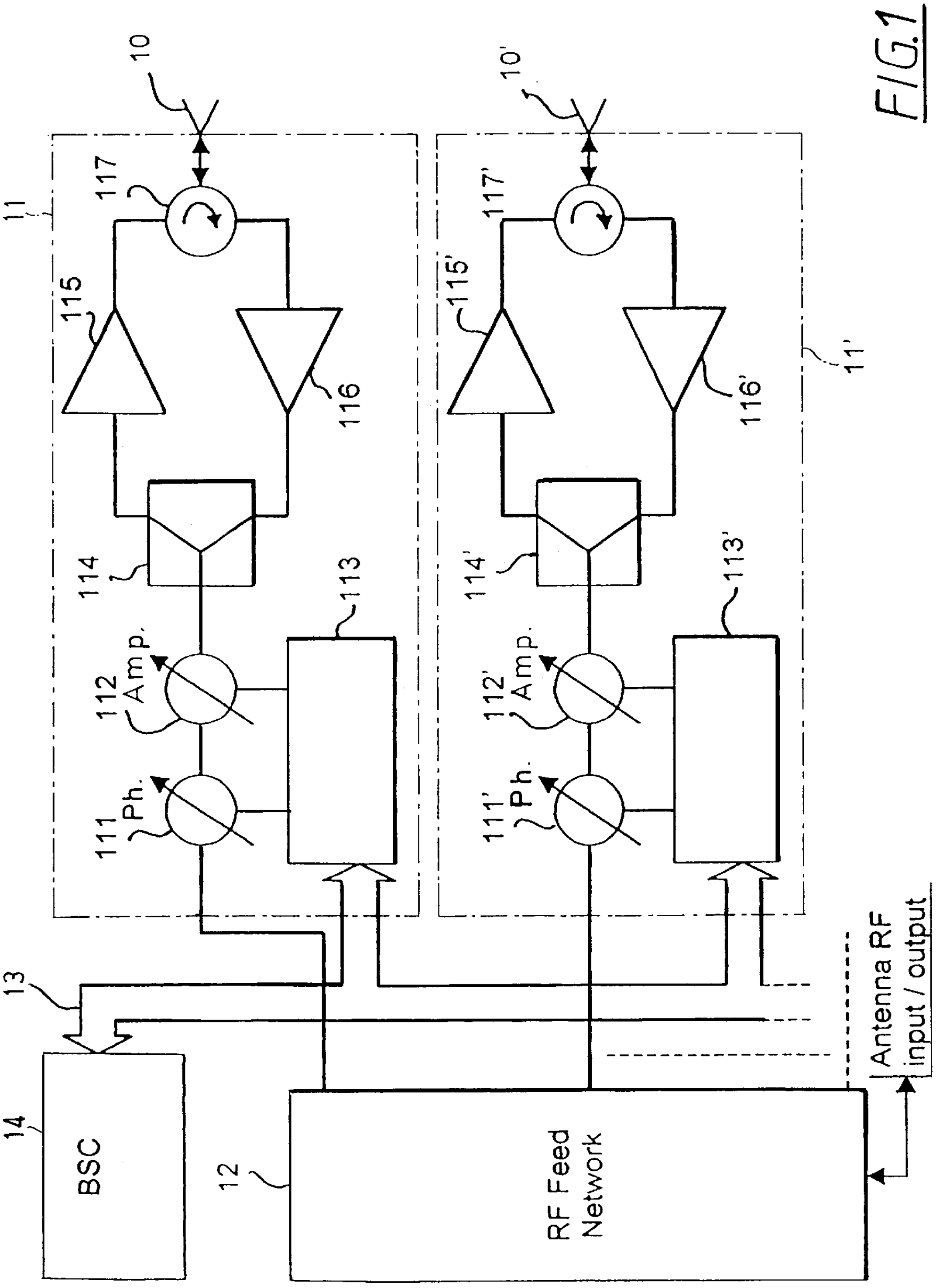
FIG. 1 schematically depicts a simplified block diagram of an active electrically steered antenna.

The electrically steered antenna array depicted in FIG. 1 includes an array of radiating elements 10, 10', two of which are shown in the figure. These elements 10, 10' are arranged in a grid to form the antenna area or aperture. The array is preferably planar, with each element being separated by a distance of less than a half wavelength from adjacent elements. In the described embodiment, the antenna is for an airborne radar system with the antenna aperture situated in the nose of the aircraft. For reasons of space, the antenna array is preferably essentially circular in shape. Each element 10, 10' of the array is connected to a transmit/receive module 11, 11' that controls the phase and amplitude of the RF signals fed to the radiating elements 10, 10'. A common RF feed network 12 is coupled to all transmit/receive modules 11, 11' for splitting and summing, RF signals on transmit and receive, respectively, to and from the radiating elements 10, 10'. The RF feed network 12 is connected to an upstream antenna RF signal input/output (not shown). The transmit/receive modules 11, 11' each include a phase shifter 111, 111' and an amplitude modulator 112, 112' for controlling the phase and amplitude of RF signals fed to the associated radiating element 10, 10'. The phase shifter 111, 111' and amplitude modulator 112, 112' are controlled by an amplitude and phase setting unit 113, 113'. The amplitude and phase setting unit 113, 113' will be described in more detail below. The RF signals to and from the radiating element 10, 10' are then split into a transmit and a receive path with a switch 114, 114'. The transmit path includes an amplifier 115, 115', preferably a power amplifier, which amplifies the outgoing RF signals before sending these to the radiating element 10, 10'. An amplifier 116, 116' is likewise arranged in the receive path for amplifying received signals. The two paths are connected to the radiating element 10, 10' via a further switch 117, 117', which is preferably a circulator.

The amplitude and phase setting units 113, 113' of all modules 11, 11' are connected via a data bus 13 to a beam steering computer (BSC) 14, which is coupled to a system control (not shown). The BSC 14 controls the direction and shape of the antenna beam by setting the amplitude and phase of each radiating element 10, 10' individually.

When mounted in an aircraft, the antenna beam side-lobes directed towards ground will pick up spurious echoes, which can interfere with the echoes from a target, a effect that is termed side-lobe clutter. Conventionally, this problem is mitigated by amplitude tapering of the antenna array to reduce the side-lobes. However, in an active phased array antenna, amplitude weighting on transmission results in loss in effective radiated power. In accordance with the invention, this problem is alleviated by phase-only tapering of the antenna array. Specifically, the phase across the antenna aperture is controlled to reduce the side-lobes that are directed towards ground. Viewed in relation to the radiation pattern in the u,v plane, u and v being the directional cosines, this means that those side-lobes located in the lower hemisphere are reduced. In an aircraft, the lower hemisphere is defined as the hemisphere that is closest to ground when the aircraft is in a normal horizontal flight position. Naturally, when the aircraft rolls, the area of the beam pattern requiring side-lobe suppression must be adjusted accordingly, as will be described further below.

In accordance with the present invention, an expression for the phase function has been determined to correct the phase applied to each radiating element 10, 10' and so substantially reduce side-lobe energy in the lower hemisphere. In order to obtain a desired beam pattern for the antenna array, the coefficients of the phase function are adjusted until the beam pattern obtained with the phase function matches a desired beam pattern. In a preferred embodiment, a Taylor diagram with a specified side-lobe level is utilised as a desired beam pattern, however, those skilled in the art will appreciate that some other appropriate model could be used. The optimization of the phase function may be performed in any known manner.

A preferred manner is to minimize the error between the beam pattern obtained using the phase function and the desired beam pattern in a least squares sense using an appropriate algorithm. It should be noted that the matching is performed for the set of directions, i.e. spatial frequencies, for which a reduction in side-lobe magnitude is required, with no regard to other directions. In the present case, this set of directions corresponds to the lower hemisphere from which clutter returns are most likely.

In accordance with the present invention, it has been determined that an asymmetric beam pattern suitable for suppressing side lobes in the lower hemisphere can be expressed in terms of the position of an element 10, 10' within the array. Preferably the element position is expressed in polar co-ordinates r, $\alpha$, where r is the radial distance from a central point in the array and $\alpha$ is the angular deviation from an arbitrarily chosen reference direction, for example along the horizontal plane. Specifically, the phase function $\phi$ applied to any one element is defined by the following expression $$\phi(r,\alpha)=\sin(\alpha)\sum_{k=1}^{p}a_{2k+1}r^{2k+1} \tag{1}$$

where $a_{2k+1}$ is a coefficient. According to this expression the phase function $\phi$ of any one element 10, 10' within the array is proportional to the sinusoid of the angular position $\alpha$ of the element and also proportional to an odd polynomial of the radial position r of at least third order.

Utilising the relationship defined in (1) the required phase correction for each element in terms of its angular and radial position in the antenna array is obtained by adjusting the value of the coefficients, $a_{2k+1}$, and thus the order of the odd polynomial to obtain the desired beam pattern. The process is essentially one of optimisation, wherein final beam pattern may have to be a compromise between the complexity of the expression and the performance.

Figure 2:
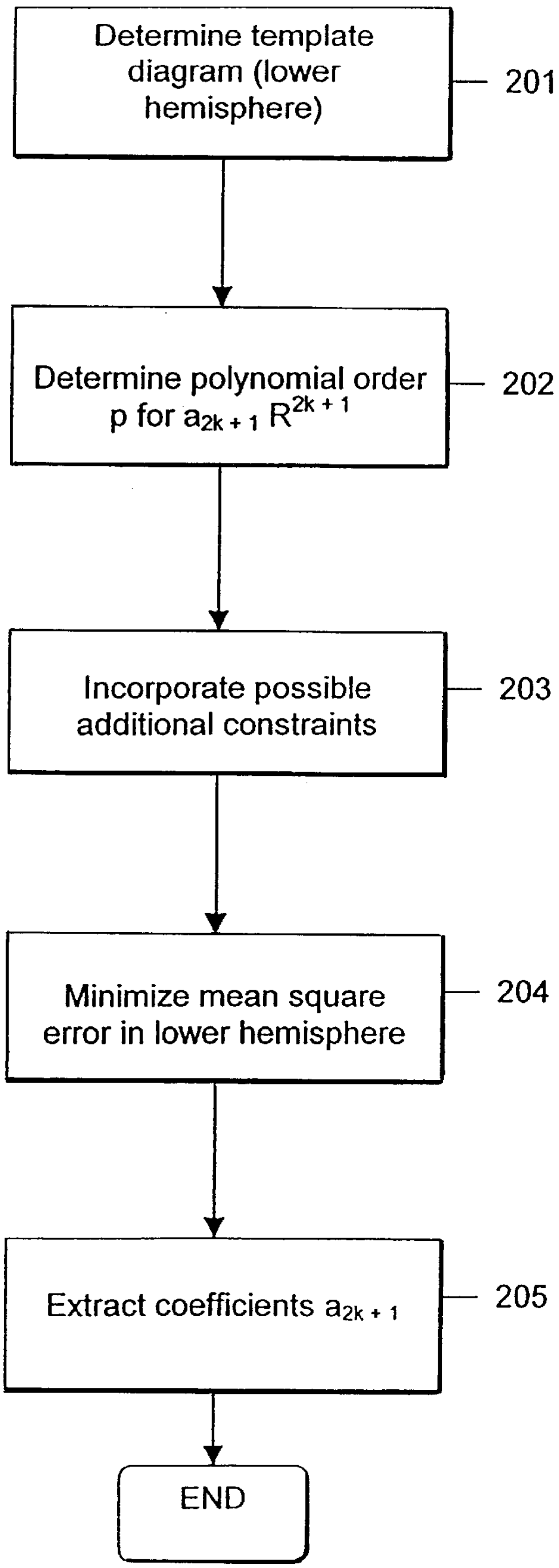
FIG. 2 is a flow diagram illustrating the steps for obtaining an optimised phase function for the desired beam pattern.

The steps for obtaining a desired beam pattern utilising the expression in (1) are illustrated in the flow diagram given in FIG. 2. The process starts in step 201 with the selection of an appropriate template diagram for the area of side-lobe suppression, i.e. the lower hemisphere. As mentioned above, this may be a Taylor diagram with a specified side-lobe level in the lower hemisphere. In the following step 202 the polynomial structure and order is set, i.e. the non-zero coefficients $a_{2k+1}$ are selected. As will be shown below, in general a polynomial comprising a single term will suffice for obtaining the desired practical side-lobe levels. Any possible additional constraints will then also be incorporated in step 203. These may include specifying the gain in the main-lobe direction and specifying the maximum peak or mean side-lobe level. In step 204 the mean square error between the template and the resulting diagram in the lower hemisphere is minimised.

Any numerical search algorithm may be used for this step. The minimisation involves a two-dimensional Fourier transformation step, since no analytical expression for the Fourier transform is available. The process is terminated in step 205 when the mean square error is less than a prescribed level and the coefficients are obtained.

By virtue of the separate term defining the relationship to angular position, $\alpha$, in the phase function of equation (1), it is very simple to adjust the phase correction for different roll angles of the aircraft. Specifically, this is achieved by shifting the angle $\alpha$ by an amount equal to the roll angle of the aircraft prior to calculating the sinusoidal term $\sin(\alpha)$. In this way the resulting beam pattern can easily be adjusted to have low side-lobes in the lower hemisphere, that is the hemisphere directed towards ground.

Table 1 below illustrates simulated beam patterns obtained utilising the phase function defined in (2) with different orders and structures of polynomial. In each case the polynomial coefficients were determined by optimising the beam pattern with a desired beam pattern in the lower hemisphere. In the present example the optimisation process was performed using the built-in least squares function “leastsq” in MATLAB, however it will be understood that any suitable optimisation process may be employed to determine the coefficients for a desired beam pattern. For each phase function the magnitude of the first side-lobe, i.e. the peak amplitude, is given in a slice through the u, v plane defined by u=0. A further quantity listed is the mean side-lobe level through the same slice where u=0. This is calculated as the two-dimensional mean of the antenna gain in the side-lobe area of the lower hemisphere. Finally, the table also gives the damping of gain. The mean side-lobe level is proportional to the total clutter power received, and is therefore a more appropriate measure of performance level than the peak side-lobe level. In Table 1, the notation $\{r^i, r^j\}$ is short for the expression sine $(a_i r^i + a_j r^j)$.

TABLE 1

| Polynomial | Peak side-lobe level, mean side-lobe level, damping (dB) | Polynomial | Peak side-lobe level, mean side-lobe level, damping (dB) |
|---|---|---|---|
| $\{r^3\}$ | −28.3, −46.3, 0.26 | $\{r^5, r^7\}$ | −33.5, −47.8, 0.88 |
| $\{r^3, r^5\}$ | −33.3, −46.9, 0.98 | $\{r^5, r^9\}$ | −33.7, −48.0, 0.92 |
| $\{r^3, r^5, r^7\}$ | −36.5, −49.6, 0.95 | $\{r^5, r^{11}\}$ | −34.9, −48.3, 0.96 |
| $\{r^3, r^5, r^7, r^9\}$ | −38.7, −49.9, 1.48 | $\{r^7\}$ | −33.9, −48.1, 1.10 |
| $\{r^3, r^5, r^7, r^9, r^{11}\}$ | −41.2, −51.2, 1.09 | $\{r^7, r^9\}$ | −32.6, −47.6, 0.94 |
| $\{r^3, r^7\}$ | −34.9, −47.8, 0.85 | $\{r^7, r^{11}\}$ | −32.6, −47.6, 0.97 |
| $\{r^3, r^9\}$ | −37.9, −48.4, 0.93 | $\{r^9\}$ | −32.1, −49.0, 1.27 |
| $\{r^3, r^{11}\}$ | −39.5, −49.2, 0.95 | $\{r^9, r^{11}\}$ | −31.8, −46.9, 0.99 |
| $\{r^5\}$ | −32.4, −47.5, 0.77 | $\{r^{11}\}$ | −27.8, −49.6, 1.49 |

It is expected that beam pattern will improve in terms of peak and mean side-lobe level and damping of the gain with an increasing numbers of terms $a_{2k+1} r^{2k+1}$ in the polynomial expression. However, it is apparent from the values of mean side-lobe level given in Table 1 that the improvement when using a large number of terms as opposed to one or two terms is not very significant. A very reasonable result can be obtained when using two terms, for example the expression $\{r^3, r^{11}\}$ or even only one term, for example the expression $\{r^7\}$. Indeed in some cases, the simple cubic relationship between phase and radial position given by the expression $\{r^3\}$ may provide adequate side-lobe suppression. It will be understood that the fewer the number of terms contained in the polynomial expression, the easier the implementation will be.

Figure 3:
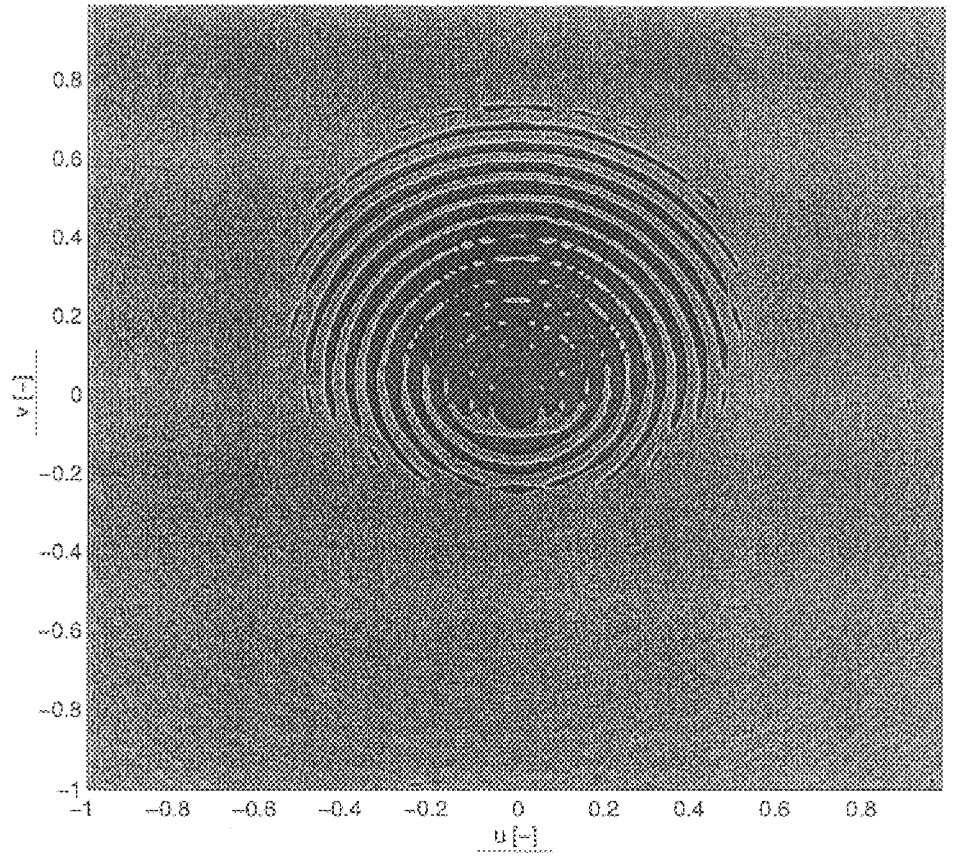
FIG. 3 shows a contour plot of the two-dimensional beam pattern in the u, v plane obtained using a phase function expressed by the polynomial $\{r^7\}$.
Figure 4:
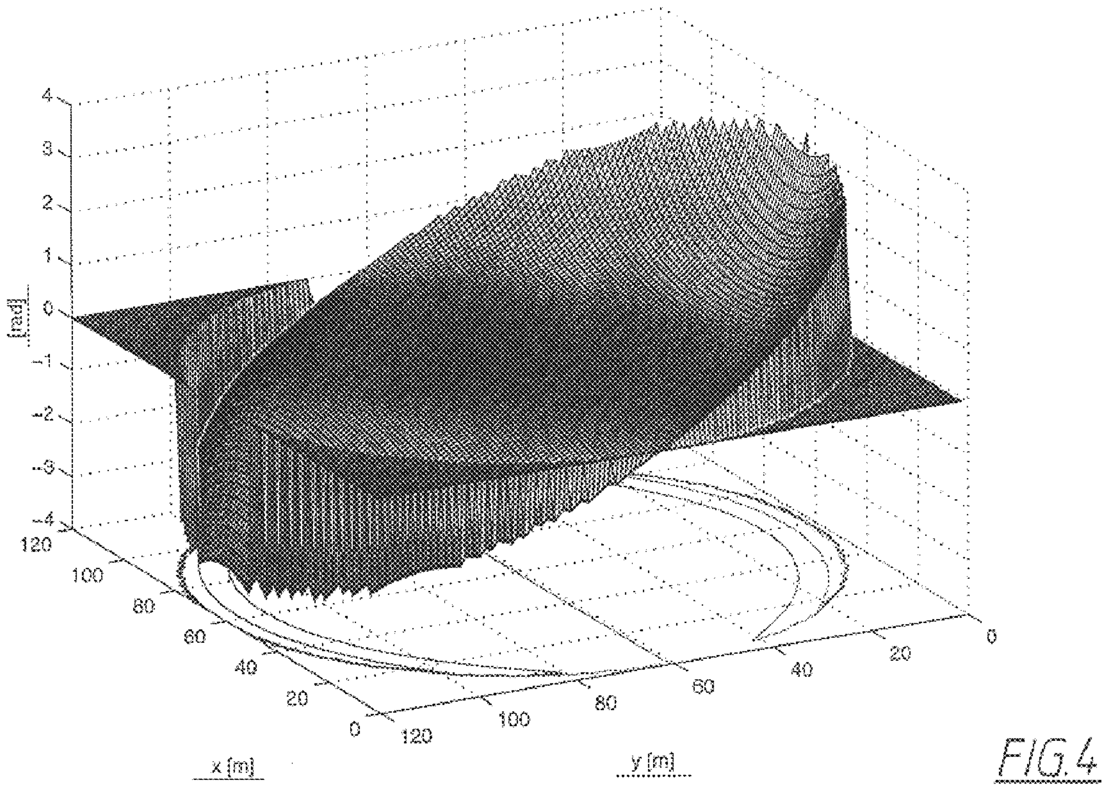
FIG. 4 shows a slice of a phase function in the x, y plane through x=0 using the $\{r^7\}$ phase function.

FIG. 3 shows a contour plot of the two-dimensional beam pattern in the u, v plane obtained using the $\{r^7\}$ phase function. The value of the coefficient $a_7$ used in this phase function was $-1.5326\times10^4$. The side-lobe reduction in the lower hemisphere is clearly visible. FIG. 4 shows a slice of the phase function in the x, y plane through x=0 .

In all the cases tabulated above, phase tapering resulted in a small pointing error when compared to the nominal beam pattern without tapering. This directional deviation can be compensated for in the beam control implemented by the beam steering computer 14 (FIG. 1).

Returning again to FIG. 1, the phase and amplitude setting units 113, 113' in each transmit/receive module 11, 11' set the phase of the RF signals fed to the radiating elements 10, 10'. The optimum phase function, i.e. the optimum coefficient values, for any given antenna utilised for any given application with required side-lobe suppression is determined on fabrication as described with reference to FIG. 2 and programmed into the antenna system. The coefficient values are then utilised to correct the phase applied to the associated radiating element 10, 10' via the associated phase shifter 111, 111' as a function of the element's 10, 10' position. The calculation of phase correction to be applied to each element 10, 10' may be accomplished centrally by the beam steering computer BSC 14 and the individual control signals distributed to the respective setting unit 113, 113' through the data bus 13. In this case the coefficient values determined on manufacture would preferably be programmed in suitable storage circuitry easily accessible by a processor in the BSC 14. The control signals could then usefully combine the individual phase correction required to suppress side-lobes in a specified area of the beam pattern as well as the phase adjustment for steering the antenna beam. In such an arrangement wherein the phase correction of all antenna elements 10, 10' is performed centrally, the setting units 113, 113' need include only storage means for holding the correct value of phase for each radiating element 10, 10'. For example, each setting unit may be essentially constituted by a memory or alternatively a particular location in a central memory, which is programmed with the desired phase values through the data bus 13 by the BSC 14. The calculated phase correction would also take account of the roll angle of the aircraft. As discussed above, this is achieved by adjusting the angular term in the phase function by the angular shift in the aircraft orientation.

In an alternative embodiment, the units 113, 113' are designed as intelligent units and incorporate processing means such as a microprocessor or the like to calculate the phase correction required to suppress side-lobes in a desired portion of the beam pattern. The setting units 113, 113' would then incorporate, or have access to, storage circuitry holding the coefficient values of the antenna specific phase function programmed prior to deployment.

Each unit 113, 113' would naturally also contain or have access to the positional data defining the associated element 10, 10' to permit the element specific phase to be calculated. To enable each setting unit 113, 113' to adjust the phase correction as a function of the aircraft orientation, each unit is additionally provided with an input indicating the roll of the aircraft i.e. indicating the side of the beam pattern on which low side-lobes are to be obtained. This information would be transmitted to all setting units 113, 113' in parallel by the BSC 14 through the bus 13, together with any phase adjustment parameters required for altering the beam direction and any parameters relative to the beam width, all of which are common to all elements 10, 10'. In the embodiment illustrated in FIG. 1, the setting units 113, 113' are associated with individual elements 10, 10'. It will be understood, however, that a single setting unit 113, 113' could control the phase and possibly also the amplitude of signals fed to and received by more than one element 10, 10'.

While the phase function developed according to the present invention, which expresses a phase correction for suppressing side-lobes in terms of the position of the radiating elements in polar co-ordinates, has been discussed and implemented for circular antenna arrays, those skilled in the art will recognise that this phase function may be applied equally well to other antenna aperture shapes, but best results are obtained with shapes that resemble the circular shape, such as an elliptical or polygonal aperture.

Furthermore, while the invention has been described in connection with an air-to-ground aircraft radar system, it will be understood that the phase function according to the present invention is equally well suited to antenna arrangements for communication between aircraft. Moreover, the invention is not limited to airborne applications, but may be utilised for any application requiring suppression of side-lobes in a desired hemisphere, such as for example antenna installations for mobile communications.

What is claimed is:

1. An antenna system comprising:

an array of antenna elements, and phase control circuitry for setting the phase of signals that may be fed to and/or received by each element, wherein the control circuitry includes a phase correction arrangement for correcting the phase setting of each element as a function of the position of each element within the array to generate an asymmetric side-lobe pattern, and wherein side-lobes on at least one side of a principal lobe are substantially suppressed.

2. The antenna system as claimed in claim 1, wherein the phase correction arrangement corrects the phase setting of each element in a manner proportional to a first function of the angular position of the element and proportional to a second function of the radial position of the element relative to a central point in the array.

3. Antenna system as claimed in claim 1, wherein the phase correction arrangement comprises several modules, each module being associated with at least one element in the array.

4. Antenna system as claimed in claim 1, wherein the array is substantially circular.

5. An antenna system comprising:

an array of antenna elements including phase control circuitry for setting the phase of signals that may be fed to and/or received by each element, wherein control circuitry includes a phase correction arrangement for correcting the phase setting of each the elements as a function of the position of each element expressed in polar co-ordinates to substantially suppress side-lobes on at least one side of a principal lobe, wherein for each element said corrected phase setting is proportional to a sinusoid of the angular position of said element within the array.

6. The antenna system as claimed in claim 5, wherein the corrected phase setting for each element is proportional to an odd polynomial of the radial position of said element, wherein said polynomial has at least one term of third order or above.

7. The antenna system as claimed in claim 5, wherein the control circuitry is adapted to adjust the relationship between phase setting and angular position of an element as a function of the orientation of the antenna array.

8. An antenna system comprising an array of antenna elements, phase control circuitry for setting the phase of signals that may be fed to and/or received by each element, wherein the control circuitry includes a phase correction arrangement for correcting the phase setting of each element as a function of the angular and radial position of each element relative to a central point in the array to generate an asymmetric side-lobe pattern, wherein side-lobes on at least one side of a principal lobe are substantially suppressed, wherein the function defines the corrected phase as proportional to an odd polynomial of radial position of each element, and wherein the polynomial has at least one term of third order or above.

9. The antenna system as claimed in claim 8, wherein the function defines the corrected phase as proportional to the sinusoid of the angular position of each element.

10. The antenna system as claimed in claim 9, wherein the control circuitry is adapted to adjust the relationship between corrected phase setting and angular position of an element as a function of the orientation of the antenna array.

11. The antenna system as claimed in claim 8, wherein the phase correction arrangement includes several modules, each module being associated with at least one element in the array.

12. The antenna system as claimed in claim 8, wherein the array is substantially circular.

13. A method of suppressing side-lobes on at least one side of a principal lobe in the beam pattern of an antenna arrangement having a plurality of antenna elements disposed to form an array, wherein each element is adapted to receive or radiate signals of a specific phase, the method including:

for each antenna element, adjusting the phase of the element in a manner proportional to a first function of the angular position of the element and proportional to a second function of the radial position of the element relative to a central point in the array.

14. A method as claimed in claim 13, characterised by adjusting the angular position of each element in said first function as a function of the absolute orientation of the array.

15. A method as claimed in claim 13, characterised in that said first function is a sinusoid.

16. A method as claimed in claim 13, characterised in that said second function is an odd polynomial including at least one term of third order or above.

17. A method of suppressing side-lobes on at least one side of a principal lobe in the beam pattern of an antenna arrangement having a plurality of antenna elements disposed to form an array, the method including:

for each antenna element, adjusting the phase of radio frequency signals that may be fed to and received by the element according to the expression:

$$\sin(\alpha)\sum_{k=1}^{p} a_{2k+1} r^{2k+1}$$

where $\alpha$ is the angular position of the element within the array and r is the radial position of the element within the array, $a_{2k+1}$ is a coefficient and p is a variable, wherein the at least one coefficient is non-zero and determined by, pre-selecting a template of beam pattern with a desired asymmetric side-lobe configuration, and for a selection of variables p, minimising the mean square error between a beam pattern generated with said polynomial and said template to determine the at least one coefficient $a_{2k+1}$.

* * * * *